Patented Nov. 23, 1943

2,335,136

UNITED STATES PATENT OFFICE 2,335,136

SULPHONATED AND HALOGENATED ORGANIC CONDENSATION PRODUCT AND PROCESS OF PREPARING IT

Urbain J. Thuau, Paris, France, assignor to Eli Lilly and Company, Indianapolis, Ind., a corporation of Indiana No Drawing. Application January 19, 1940, Serial No. 314,626. In France January 30, 1939

1 Claim. (Cl. 260—507)

My invention relates to certain therapeutically effective, water-soluble, colloidal, sulphonated and halogenated, organic condensation products of relatively high molecular weight, including water-soluble salts; and to the process of producing them.

In these condensation products, aromatic hydrocarbon groups of from one to three rings, with those rings condensed rings (naphthalene, anthracene, phenanthrene) when more than one are in a group, are joined together through aldehydic carbon atoms—that is, through methylene groups, or substituted-methylene groups in which one of the hydrogens of the methylene group is replaced by a substituent such as a lower-alkyl group or a lower-alkylene group or a phenyl or hydroxyphenyl group or a furyl group. Each of the majority of these aromatic hydrocarbon groups has at least one sulphonic-acid substituent, and each of the remaining aromatic hydrocarbon groups has either at least one sulphonic-acid substituent or at least one carboxyl substituent; and each of at least some of the aromatic hydrocarbon groups, including any in which the acid-substituent group is the carboxyl group, also has at least one halogen substituent, preferably iodine. The aromatic hydrocarbon groups may also have methyl and/or hydroxyl substituents.

Although it is impossible as yet to give the exact chemical formulas of these condensation products, they may be visualized as long-chain molecules which contain some segments of the following composition:

(1)

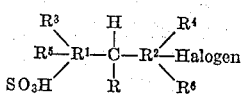

in which

R represents hydrogen or a lower-alkyl or lower-alkylene or phenyl or hydroxyphenyl or furyl group;

$R^1$ represents an aromatic nucleus having not over three rings, with the rings condensed if there are more than one (benzene, naphthalene, anthracene, phenanthrene);

$R^2$ represents an aromatic nucleus having not over three rings, with the rings condensed if there are more than one, (benzene, naphthalene, anthracene, phenanthrene);

$R^3$, of which there may more than one, represents hydrogen or hydroxyl or methyl, or a sulphonic-acid radical;

$R^4$, of which there maye be more than one, represents hydrogen or hydroxyl or methyl, or $R^6$ as defined below;

$R^5$ represents hydrogen or a halogen;

$R^6$ represents the sulphonic-acid group or the carboxyl group;

and in which more than one halogen may be attached to $R^2$, and the number of substituents which may take the place of hydrogen is of course not in excess of the number of replaceable hydrogens; and in some cases some segments of the following composition:

(2)

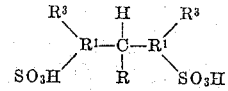

in which R, $R^1$, and $R^3$ have the meanings given above.

The products embodying my invention are strongly ionized in aqueous solutions, and those aqueous solutions react in a manner which indicates that such products are of a colloidal nature. The colloidal particles in solutions of these products bear electro-negative charges, for in such solutions it is the anion which by virtue of its dimensions produces the colloidal characteristic.

It is known that the colloidal state plays an important part in therapeutics, and in the character of effects produced on living organisms. For example, it is known that certain potassium salts are definitely toxic when in the state of simple K+ ions, but that they lose their toxicity and acquire therapeutic power when in the state of colloidal complexes. The disinfecting and bactericidal power of chemical compounds is considerably influenced by their degree of dispersion.

On account of their chemical constitution, of their high solubility in water, and of their colloidal nature in aqueous solution, the products embodying the present invention have considerable therapeutic value, in promoting healing of diseased tissue, and especially in cervicitis, which renders their use as pharmaceutical products very advantageous, either alone or in combination with known pharmaceutical products.

In carrying out my invention, I condense with an aldehyde one or more reactants which have aromatic hydrocarbon groups of from one to three rings, with those rings condensed rings (naphthalene, anthracene, phenanthrene) when more than one are in a group. The aldehyde may be and desirably is formaldehyde; but it may be a lower-alkyl aldehyde (such as acetaldehyde) or a lower-alkylene aldehyde (such as acrolein) or a phenyl or hydroxyphenyl aldehyde (such as benzaldehyde or salicylic aldehyde) or a heterocyclic aldehyde (such as furfural). Each of the majority of the aromatic hydrocarbon groups of the reactant or reactants used has at least one sulphonic-acid substituent, and each of the remaining aromatic hydrocarbon groups has either at least one sulphonic-acid substituent or at least one carboxyl substituent; and each of at least some of the aromatic hydrocarbon groups of such reactant or reactants, including any in which the acid-substituent group is the carboxyl group, also has at least one halogen substituent, preferably iodine. The aromatic hydrocarbon groups of the reactant or reactants may also have methyl and/or hydroxyl substituents. If there is only one aromatic hydrocarbon reactant, it is both sulphonated and halogenated. If there are two different aromatic hydrocarbon reactants, one is sulphonated (whether or not it is halogenated), and the other is halogenated (whether or not it is sulphonated).

In the condensation, the aromatic reactants are mixed together if there are more than one, and are mixed with water as a diluent to lower the boiling point; and are condensed with the aldehyde, desirably first at relatively low temperature, such as room temperature, and then at the boiling point.

The character of the final product may vary considerably, depending upon a. The proportion between the two aromatic reactants,
b. The amount of the aldehyde used,
c. The temperature at which the condensation is effected,
d. The amount of diluent used, and
e. The period of time the condensation is allowed to continue.

When the two different aromatic reactants are different, and the one that is sulphonated is not halogenated, I deem it desirable to have:

a. From 5 to 50 molar equivalents of the sulphonated non-halogenated aromatic reactant for each molar equivalent of the halogenated aromatic reactant.
b. From 1.0 to 3.5 molar equivalents of the two aromatic reactants together for each molar equivalent of the aldehyde.
c. The temperature of final condensation between 100° C. and 110° C., preferably about 107° C.
d. The diluting water present in such amount as is necessary to produce boiling at the temperature prescribed in sub-paragraph c next above.
e. The time the final condensation is allowed to proceed sufficiently long to cause turbidity to disappear.

When there is only one aromatic reactant, sulphonated and halogenated, I deem it desirable to have the conditions as outlined in items b, c, d, and e just above.

Examples of non-halogenated aromatic reactants which may be used include the following:

Benzenesulphonic acid,
Naphthalenesulphonic acid,
Anthracenesulphonic acid,
Phenanthrenesulphonic acid,
Phenolsulphonic acid,
Naphtholsulphonic acid,
Cresolsulphonic acid, desirably metacresolsulphonic acid,
Toluenesulphonic acid.

Examples of halogenated aromatic reactants include the following:

a. The halogenated analogues of the sulphonic acids listed as examples of non-halogenated aromatic reactants; including halogenated phenolsulphonic acids, such as mono- and di-iodo-metacresolsulphonic acid.
b. Halogenated phenolcarboxylic acids, such as mono- and di-iodo-salicylic acids.
c. Halogenated oxyphthalic acids, such as iodo-oxyphthalic acid.
d. Halogenated resorcine disulphonic acids, such as iodoresorcine-disulphonic acid.

The halogen used is most desirably iodine, present either as a mono-iodo or di-iodo compound; with bromine and chlorine somewhat less desirable in the order named.

In any of the examples given for the aromatic reactants, there may be methyl or hydroxyl substituents; but the desired condensation is more easily obtained without many of them, and the difficulty of obtaining the condensation increases as the number of those substituents is increased, and so the aromatic reactants should have fewer than the maximum possible number of substituents.

Examples of the aldehyde used as a condensing agent include:

Aliphatic aldehydes, such as:
  Formaldehyde,
  Acetaldehyde,
  Acrolein.
Aromatic aldehydes, such as:
  Benzaldehyde,
  Salicylic aldehyde.
Heterocyclic aldehydes, such as:
  Furfural.

The condensation products, when dried as far as possible under vacuum and over sulphuric acid, conveniently at about 50° C., are generally semi-liquid substances of high viscosity which mix with water in all proportions and give colloidal aqueous solutions, although in some instances they are obtained in solid amorphous forms. The colloidal aqueous solutions are acid in reaction, but may be neutralized, partially or wholly, by the addition of inorganic or organic bases, or their solutions, to obtain water-soluble salts; such for instance as the salts of the alkali metals (such as sodium), the alkaline-earth metals (such as calcium), ammonium, mono-alkyl ammonium (such as methyl ammonium), dialkyl ammonium (such as diethyl ammonium), and alkanol ammonium (such as monoethanol ammonium).

My invention includes many variations, but its nature will be sufficiently clear from the following examples and from the appended claim.

*Example 1.*—100 g. of metal-cresol-sulphonic acid are mixed with 25 cc. of water. To this mixture are added 6 g. of 3,5-di-iodo-salicylic acid; and then, preferably with stirring, 25 g. of a 10° Baumé aqueous solution of formaldehyde, which is introduced sufficiently slowly, drop by drop with the stirring, to prevent the temperature from rising above about 60° C. This reaction mixture is allowed to stand in the cold (room temperature or lower) for at least 48 hours; which is important. Then, to complete the reaction, the reaction mixture is heated to the boiling point for about two hours; and care is taken that that boiling point is not above a maximum of about 107° C., and desirably somewhat below that maximum, to which end it is sometimes necessary to add additional water. The reaction mixture is very turbid when it is first made, but during the heating it acquires a dark red color, and the end of the reaction is indicated by the almost complete disappearance of the turbidity. After being heated for about two hours, the solution is cooled to about room temperature, and then is diluted to any desired density, and is filtered to separate the liquid from any insoluble substances which may be present. The filtrate is the desired product in aqueous solution; and it may be used in that form of an aqueous solution, or it may be concentrated to any desired extent by the removal of water by evaporation under vacuum. Also, if desired, the solution may be partly or completely neutralized by the addition of a suitable base, such as sodium hydroxide or ammonium hydroxide or ethanolamine.

The product thus obtained, whether in its original acid form or in its salt form, and whether in dilute or concentrated solution, may be used effectively for various therapeutic purposes. In using it, it may be used alone; or it may be used mixed with other material, as in the form of suppositories or ointments. It is especially indicated in cervicitis. In so using it, I deem it best to use it in a mixture with more or less similar but halogen-free products, which latter products form the subject of my co-pending application Serial No. 305,655, filed November 22, 1939.

In the above-described condensation of meta-cresolsulphonic acid and 3,5-di-iodo-salicylic acid with formaldehyde, various nuclei of the two aromatic reactants are joined together by $CH_2$ groups (of the formaldehyde), and thus through aldehydic carbon atoms. As yet it is impossible to give the exact formula of the product resulting from the condensation. However, the condensation product probably has chain-like molecules, and I believe that these molecules contain some iodine-containing segments which may be represented by the following structural formula, in which I make no attempt to indicate the precise points of attachment of the methylene link to the two benzene rings:

(3)

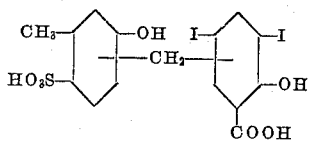

By varying the ratio of the di-iodo-salicylic acid to the metacresolsulphonic acid, a series of condensation products may be obtained which have different contents of chemically combined iodine.

*Example 2.*—A solution is formed of 100 g. of anthracene-sulphonic acid in 80 cc. of water, at 70° C. To this solution are added 15 g. of 3,5-di-iodo-salicylic acid, and the whole stirred to obtain an intimate mixture, while maintaining the temperature at about 75–80° C. To this mixture are slowly added, drop by drop, 25 g. of an aqueous solution of 10° Baumé formaldehyde, while carefully keeping the temperature from rising above about 80° C. The stirring is continued until the odor of formaldehyde disappears. After then allowing the mixture to stand in the cold for about twenty-four hours, it is heated, first on a water bath and then over an open flame, to produce boiling, and is then put under a reflux condenser for about one and a half to two hours, until the mixture is no longer turbid. It is necessary to take care to add in advance of the heating a sufficient quantity of water so that the boiling point does not exceed about 105° C.

The mixture is then diluted as desired, as with 100 cc. of water; and is filtered while hot to eliminate any insoluble substances which may have been formed during the reaction. The filtrate is then allowed to cool; and may be used either in the acid form thus obtained or in the form of a salt obtained by adding a suitable base. If desired, either the acid or the base may be obtained in concentrated solution, or either in a solid or semi-solid form, by evaporating the water under vacuo.

*Example 3.*—100 g. of β-naphtholsulphonic acid in 80 g. of water are mixed with 25 g. of 2,6-di-iodo-m-cresolsulphonic acid-4, and the whole heated to about 80° C. for about three hours, during which time about 22 g. of an aqueous solution of 10° Baumé formaldehyde are slowly added. The stirring is continued until the smell of formaldehyde disappears. After then allowing the mixture to stand in the cold for about twenty-four hours, it is heated, first on a water bath and then over an open flame, to produce boiling, and is then put under a reflux condenser for about one and a half to two hours, until the mixture is no longer turbid. It is necessary to take care to add in advance of the heating a sufficient quantity of water so that the boiling point does not exceed about 105° C. Then the resultant product may be diluted with water, and is desirably filtered hot to eliminate any co-present insoluble matter.

*Example 4.*—100 g. of chloro-β-naphthalene-sulphonic acid added to about 40 cc. of water are heated on a water bath to about 55° C. While that temperature is maintained, about 17 g. of an aqueous solution of formaldehyde, of about 10° Baumé, is slowly added, with stirring. The reaction is exothermic; and care must be taken that the addition of the formaldehyde is sufficiently slow so that the temperature of the mixture does not rise above about 70° C. The mixture thickens rapidly, and takes on a yellow-red color. After the addition of the formaldehyde is finished, the mixture is allowed to cool; and the cooled mass is allowed to stand until the odor of formaldehyde disappears, which usually requires about six hours. The anhydrous product can be obtained by evaporation of the water in vacuo. It is a soft red brown resin, which is soluble in water in all proportions.

In all the foregoing examples, the halogenated aromatic reactant has been a di-iodo acid when iodine was the halogen; but in every instance it is possible to use instead the corresponding mono-iodo acid. In Example 4 the aromatic reactant used, in that case the only aromatic reactant, was a mono-chloro acid; but it is possible to use instead the di-chloro acid or the corresponding mono-iodo or di-iodo acid.

Similarly, in all the foregoing examples, the aldehyde used has been formaldehyde, which I prefer; but in every instance it is possible to use other aldehydes instead, such for instance as acetaldehyde or benzaldehyde.

I claim as my invention:

A water-soluble, colloidal, organic condensation product of formaldehyde, metacresol sulphonic acid, and a di-iodo-salicylic acid.

URBAIN J. THUAU.